US012320483B2

(12) United States Patent
Otsuka

(10) Patent No.: US 12,320,483 B2
(45) Date of Patent: Jun. 3, 2025

(54) VEHICLE LAMP

(71) Applicant: Stanley Electric Co., Ltd., Tokyo (JP)

(72) Inventor: Fumiya Otsuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/715,581

(22) PCT Filed: Oct. 25, 2022

(86) PCT No.: PCT/JP2022/039673
§ 371 (c)(1),
(2) Date: May 31, 2024

(87) PCT Pub. No.: WO2023/105962
PCT Pub. Date: Jun. 15, 2023

(65) Prior Publication Data

US 2025/0020298 A1 Jan. 16, 2025

(30) Foreign Application Priority Data

Dec. 8, 2021 (JP) ................................ 2021-199434

(51) Int. Cl.
*F21S 41/24* (2018.01)
*F21S 41/147* (2018.01)
*F21S 41/33* (2018.01)

(52) U.S. Cl.
CPC ............. *F21S 41/24* (2018.01); *F21S 41/147* (2018.01); *F21S 41/334* (2018.01)

(58) Field of Classification Search
CPC ........ F21S 41/147; F21S 43/249; F21S 43/14; F21S 41/141; F21S 43/245; F21S 43/243; F21S 43/251; F21S 41/00; F21S 43/00; F21S 43/50; F21S 43/241; F21S 43/237; F21Y 2115/10; G02B 6/0038; G02B 6/00; B60Q 1/2665; B60Q 1/30; B60Q 1/44; B60R 1/1207; F21W 2103/00;
(Continued)

(56) References Cited

U.S. PATENT DOCUMENTS 8,545,070 B2 * 10/2013 Sakiyama ............ F21S 43/245
362/494
2006/0234612 A1 10/2006 Gotthardt

FOREIGN PATENT DOCUMENTS

CN 105987335 A * 10/2016 ........... B60C 1/0041
JP 2013-016460 A 1/2013
(Continued)

OTHER PUBLICATIONS

Search English translation of CN-105987335-A (Year: 2016).*
(Continued)

*Primary Examiner* — Omar Rojas Cadima
(74) *Attorney, Agent, or Firm* — KENEALY VAIDYA LLP

(57) ABSTRACT

A vehicle lamp has a first light emitting surface and a second light emitting surface forming a light emitting surface, which is continuous in a vehicle width direction, by connecting a back surface on a tip side of a first light guide lens and a front surface on a base end side of a second light guide lens via a connecting portion, and a first lateral emission surface configured to emit some of first light guided in the first light guide lens toward an inner side in a vehicle width direction is provided on the connecting portion.

9 Claims, 7 Drawing Sheets

(58) Field of Classification Search
CPC ........... F21W 2103/20; F21W 2102/00; F21W 2103/35; F21W 2107/10
See application file for complete search history.

(56) References Cited

FOREIGN PATENT DOCUMENTS

| | | | | |
|---|---|---|---|---|
| JP | 2014-067514 | A | 4/2014 | |
| JP | 2014-127357 | A | 7/2014 | |
| JP | 6560514 | B2 | 7/2019 | |
| JP | 2021-182488 | A | 11/2021 | |
| WO | WO-2018074242 | A1 * | 4/2018 | ........... B60Q 1/2607 |

OTHER PUBLICATIONS

Search English translation of WO-2018074242-A1 (Year: 2018).*
International Search Report for PCT/JP2022/039673 dated Dec. 20, 2022.

* cited by examiner

1A

1A

VEHICLE LAMP

This application is a U.S. National Stage Application under 35 U.S.C § 371 of International Patent Application No. PCT/JP2022/039673 filed Oct. 25, 2022, which claims the benefit of priority under 35 U.S.C. § 119 to Japanese Patent Application No. 2021-199434 filed Dec. 8, 2021, the disclosures of all of which are hereby incorporated by reference in their entireties.

TECHNICAL FIELD

The present invention relates to a vehicle lamp.

BACKGROUND ART

In the related art, as a vehicle lamp mounted on a vehicle, a configuration in which a light source such as a light emitting diode (LED) or the like, and a light guide lens such as an inner lens or the like are combined is known (for example, see the following Patent Document 1). In such a vehicle lamp, due to diversification of design, various forms have been developed.

For example, the following Patent Document 1 discloses a configuration in which light emitted from a light source enters from a base end side of a light guide lens, light is guided toward a tip side of the light guide lens, light reflected by a plurality of reflection cuts provided on a back surface side of the light guide lens is emitted from a front surface side of the light guide lens, and light emitted from a protrusion portion provided on a side surface of the light guide lens is radiated laterally.

CITATION LIST

Patent Document

[Patent Document 1]
Japanese Unexamined Patent Application, First Publication No. 2014-127357
[Patent Document 2]
Japanese Patent No. 6560514

SUMMARY OF INVENTION

Technical Problem

Incidentally, in the invention disclosed in the above-mentioned Patent Document 1, since light repeatedly reflected in the light guide lens is directed toward the protrusion portion, light radiated laterally from the protrusion portion becomes light with no directionality (diffused light). For this reason, the light intensity of the light radiated laterally may become too low, and may no longer meet the legal standard light intensity requirements.

For example, since the light radially emitted from the LED has an emission angle of 300 or more, the light is guided in the light guide lens while repeating reflection in the light guide lens and spreading within a certain angular range. Accordingly, the light directed toward the protrusion portion is also radiated laterally from the protrusion portion as the diffused light while spreading.

For example, in the vehicle lamp that requires lateral irradiation, such as a clearance lamp, a turn lamp, or the like, when a position when the vehicle is seen from the front is set as 0°, it is necessary to satisfy the legal standard light distribution angle (visual recognition angle) with an angular range of +80° outward and −45° inward in the vehicle width direction, and ±15° in the upward/downward direction.

However, in the vehicle lamp in the related art, even when the light can be directed inward in the vehicle width direction at −45° and downward at around −15°, the light intensity will become too weak, making it difficult to satisfy the above-mentioned legal standard light distribution angle (visual recognition angle).

An aspect of the present invention is directed to providing a vehicle lamp capable of making a light emitting surface emit light more uniformly while satisfying the legal standard light distribution angle.

Solution to Problem

In order to achieve the aforementioned objects, the present invention provides the following configurations.

(1) A vehicle lamp including:

a first light emitting unit including a first light source and a first light guide lens, and configured to cause first light emitted from the first light source to enter from a base end side of the first light guide lens, guide the first light toward a tip side of the first light guide lens, emit the first light reflected by a plurality of reflection cuts provided on a back surface side of the first light guide lens from a front surface side of the first light guide lens, and thus cause a first light emitting surface provided on the front surface side of the first light guide lens to emit light; and a second light emitting unit including a second light source and a second light guide lens, and configured to cause second light emitted from the second light source to enter from a base end side of the second light guide lens, guide the second light toward a tip side of the second light guide lens, emit the second light reflected by a plurality of reflection cuts provided on a back surface side of the second light guide lens from a front surface side of the second light guide lens, and thus cause a second light emitting surface provided on the front surface side of the second light guide lens to emit light, wherein the first light emitting surface and the second light emitting surface form a light emitting surface, which is continuous in a vehicle width direction, by connecting a back surface on the tip side of the first light guide lens and a front surface on the base end side of the second light guide lens via a connecting portion, and a first lateral emission surface configured to emit some of the first light guided into the first light guide lens toward an inner side in the vehicle width direction is provided on the connecting portion.

(2) The vehicle lamp according to the above-mentioned (1), wherein the first light guide lens includes a light incidence part configured to cause the first light emitted from the first light source to enter inside of the first light guide lens, and a reflecting part configured to reflect the first light entered from the light incidence part toward a tip side of the first light guide lens, and among the first light guided in the first light guide lens, the first lateral emission surface emits the first light, which is reflected by the reflecting part and directly advances to the first lateral emission surface, toward the inner side in the vehicle width direction.

(3) The vehicle lamp according to the above-mentioned (1) or (2), wherein a second lateral emission surface configured to emit some of the second light, which is guided in the second light guide lens, toward the inner side in the vehicle width direction is provided on the tip side of the second light guide lens.

(4) The vehicle lamp according to the above-mentioned (3), including an inner lens configured to cover a front surface side of the first light guide lens and a front surface side of the second light guide lens, wherein the inner lens has a first transmission part configured to transmit the first light emitted from the first lateral emission surface and the second light emitted from the second lateral emission surface, and a first light distribution controller configured to control a light distribution of the first light and a light distribution of the second light that are emitted from the first transmission part toward the inner side in the vehicle width direction is provided on the first transmission part.

(5) The vehicle lamp according to the above-mentioned (4), including an outer lens configured to cover a front surface side of the inner lens, wherein the outer lens has a second transmission part configured to transmit the first light and the second light that have passed through the first transmission part, and a second light distribution controller configured to control a light distribution of the first light and a light distribution of the second light that are emitted from the second transmission part toward the inner side in the vehicle width direction is provided on the second transmission part.

(6) The vehicle lamp according to any one of the above-mentioned (1) to (5), wherein the connecting portion has a third light emitting surface configured to emit some of the second light guided in the second light guide lens toward a front surface side of the connecting portion, and the third light emitting surface is provided on a stepped portion formed between the first light emitting surface and the first lateral emission surface.

(7) A vehicle lamp including a light emitting unit including a light source and a light guide lens, and configured to cause light emitted from the light source to enter from a base end side of the light guide lens, guide first light toward a tip side of the light guide lens, emit the light reflected by a plurality of reflection cuts provided on a back surface side of the light guide lens from a front surface side of the light guide lens, and thus cause a light emitting surface provided on the front surface side of the light guide lens to emit light, wherein a lateral emission surface configured to emit some of the light guided in the light guide lens toward an inner side in a vehicle width direction is provided on the tip side of the light guide lens.

(8) The vehicle lamp according to the above-mentioned (7), wherein the light guide lens includes a light incidence part configured to cause the light emitted from the light source to enter inside, and a reflecting part configured to reflect the light entered from the light incidence part toward a tip side of the light guide lens, and among the light guided into the light guide lens, the lateral emission surface emits the light, which is reflected by the reflecting part and directly advances to the lateral emission surface, toward the inner side in the vehicle width direction.

(9) The vehicle lamp according to the above-mentioned (7) or (8), including an inner lens configured to cover the front surface side of the light guide lens, wherein the inner lens has a first transmission part configured to transmit the light emitted from the lateral emission surface, and a first light distribution controller configured to control a light distribution of the light emitted from the first transmission part toward the inner side in the vehicle width direction is provided on the first transmission part.

(10) The vehicle lamp according to the above-mentioned (9), including an outer lens configured to cover a front surface side of the inner lens, wherein the outer lens has a second transmission part configured to transmit the light passed through the first transmission part, and a second light distribution controller configured to control a light distribution of the light emitted from the second transmission part toward the inner side in the vehicle width direction is provided on the second transmission part.

Advantageous Effects of Invention

According to the aspect of the present invention, it is possible to provide a vehicle lamp capable of making a light emitting surface emit light more uniformly while satisfying the legal standard light distribution angle.

DESCRIPTION OF EMBODIMENTS

Figure 1:
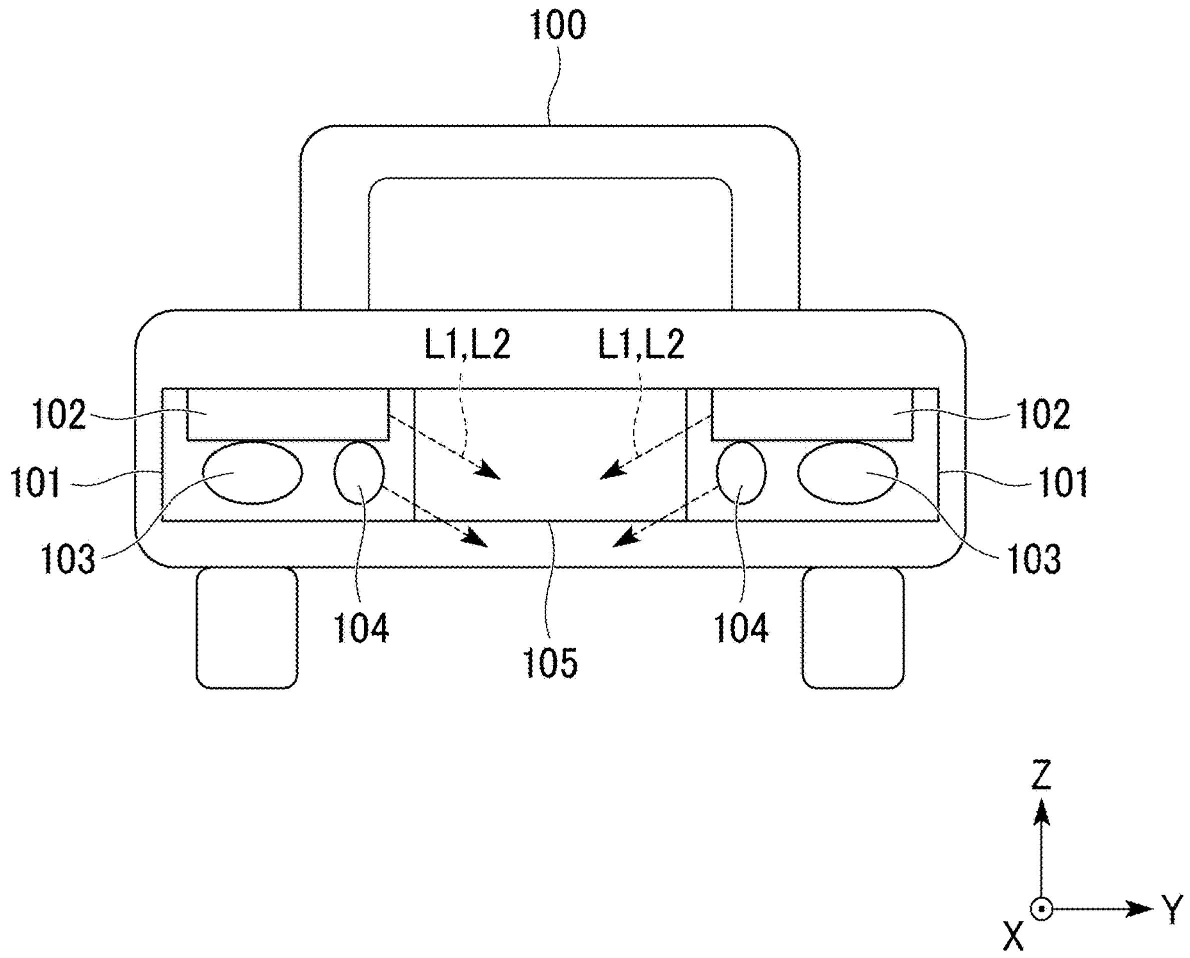
FIG. 1 is a front view showing a vehicle on which a vehicle lamp according to a first embodiment of the present invention is mounted.

Hereinafter, embodiments of the present invention will be described with reference to the accompanying drawings.

Further, in the drawings used in the following description, in order to make each component easier to see, dimensions may be shown at different scales depending on the components, and a dimensional ratio of each component may not be the same as in reality.

In addition, in the drawings described below, an XYZ orthogonal coordinate system is set, an X-axis direction indicates a forward/rearward direction (a lengthwise direction) of a vehicle lamp, a Y-axis direction indicates a leftward/rightward direction (a widthwise direction) of the vehicle lamp, and a Z-axis direction indicates an upward/downward direction (a height direction) of the vehicle lamp.

First Embodiment

As a first embodiment of the present invention, for example, a vehicle lamp 1A shown in FIG. 1 to FIG. 7 will be described.

Figure 2:
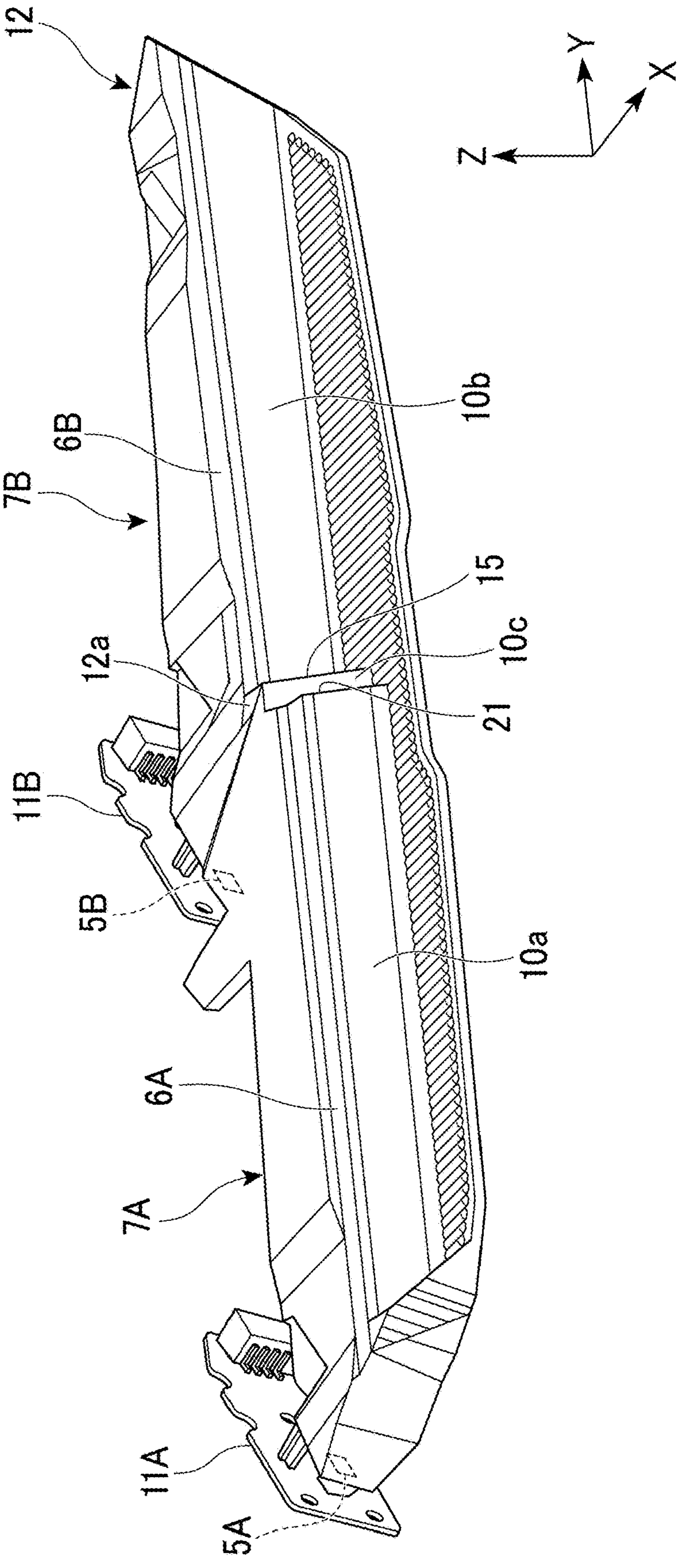
FIG. 2 is a perspective view showing a configuration of the vehicle lamp shown in FIG. 1.
Figure 3:
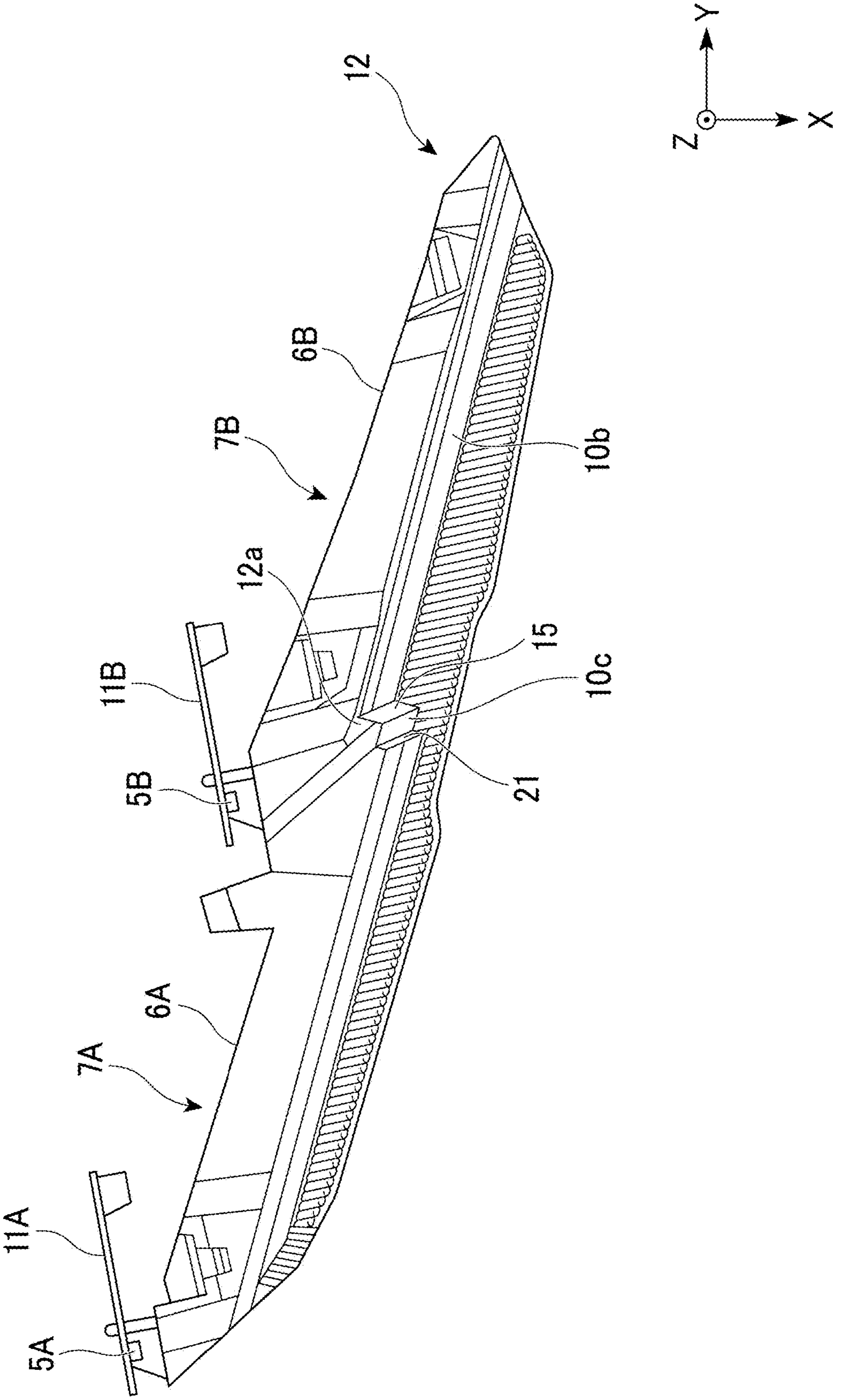
FIG. 3 is a plan view showing a configuration of the vehicle lamp shown in FIG. 1.
Figure 4:
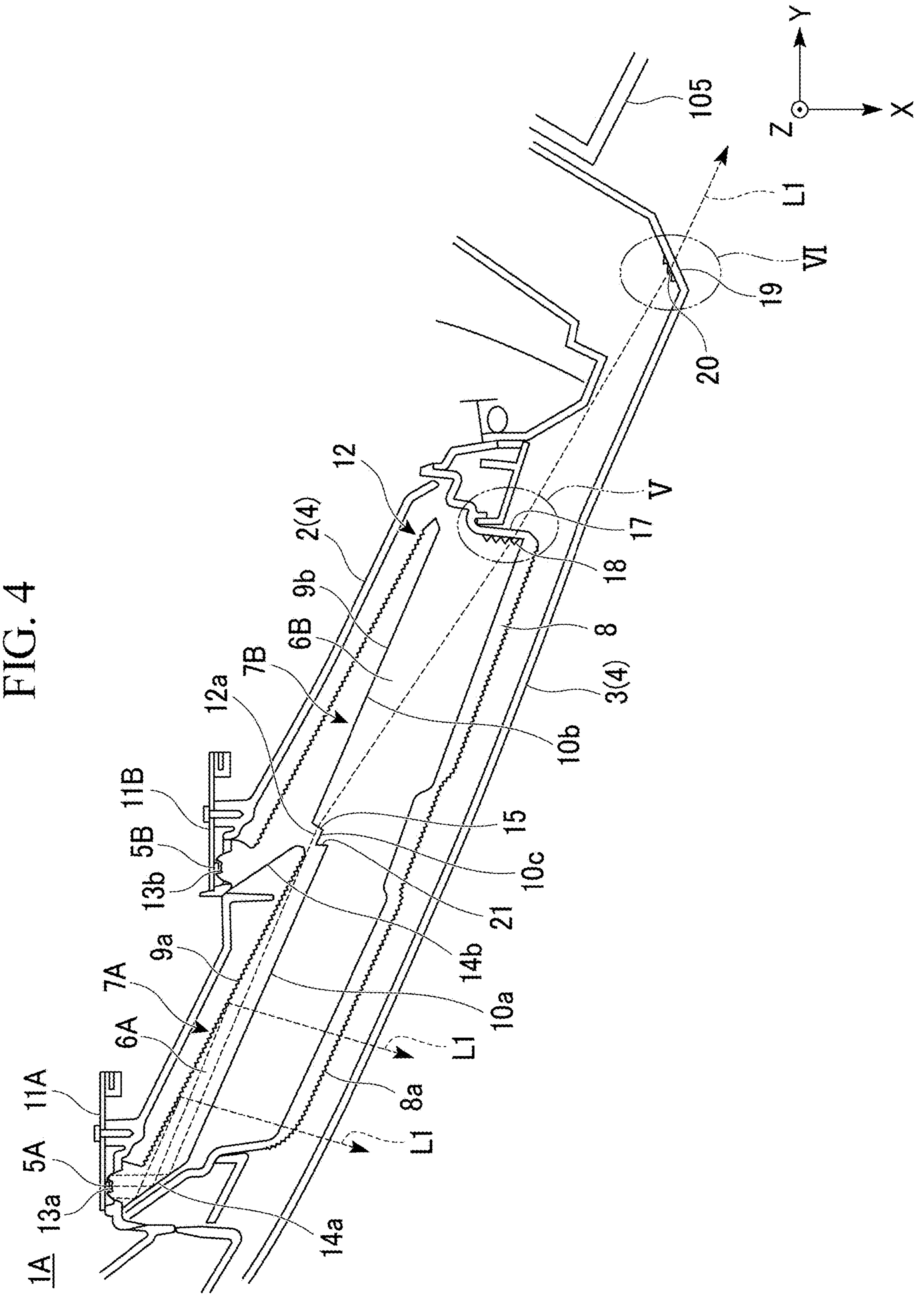
FIG. 4 is a cross-sectional view showing a configuration of the vehicle lamp shown in FIG. 1 and an optical path of first light.
Figure 5:
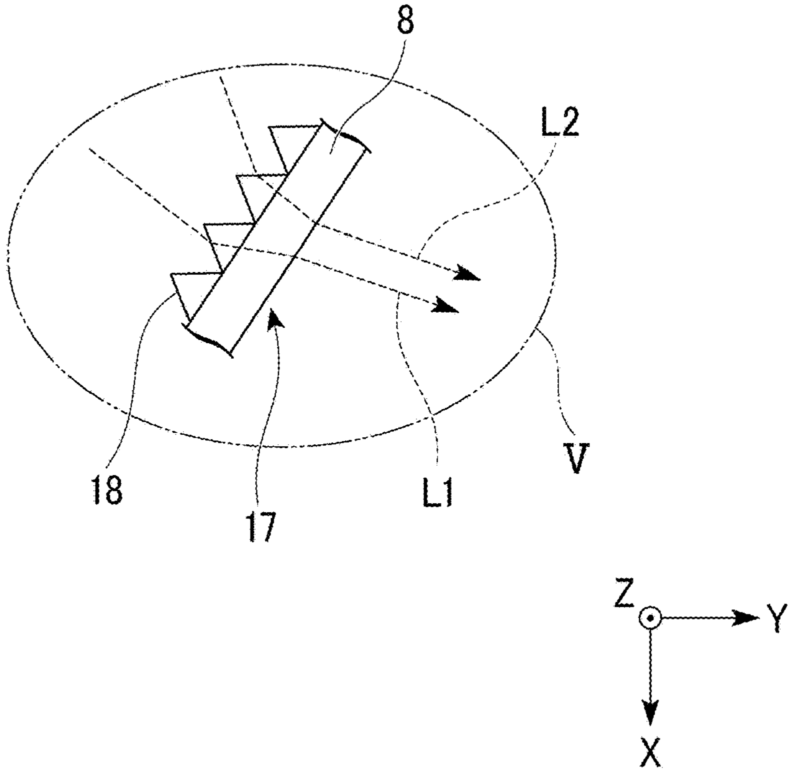
FIG. 5 is an enlarged cross-sectional view of a surrounded portion V shown in FIG. 4.
Figure 6:
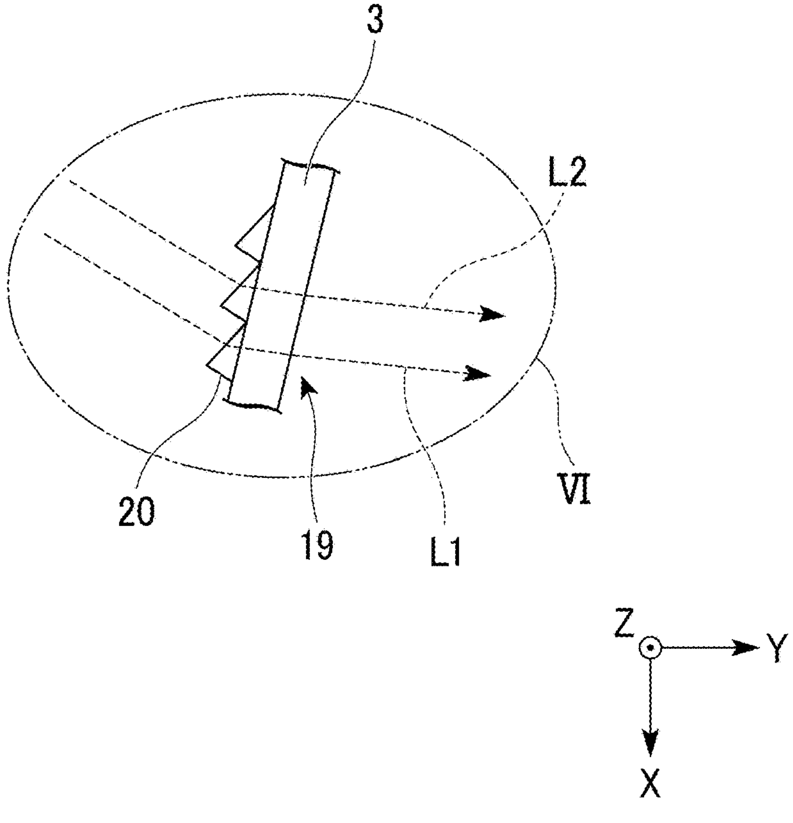
FIG. 6 is an enlarged cross-sectional view of a surrounded portion VI shown in FIG. 4.
Figure 7:
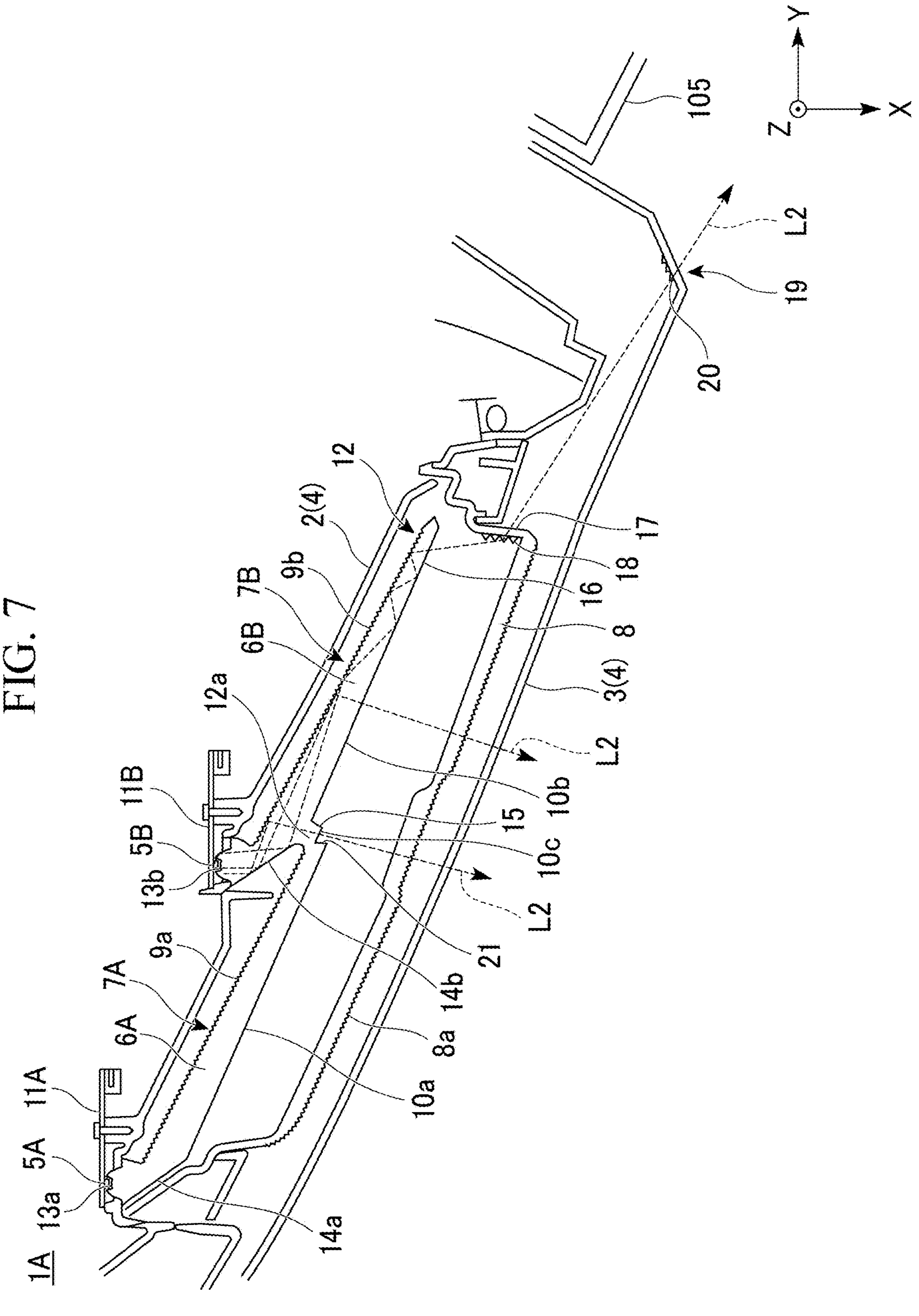
FIG. 7 is a cross-sectional view showing the configuration of the vehicle lamp shown in FIG. 1 and an optical path of second light.

Further, FIG. 1 is a front view showing a vehicle 100 on which the vehicle lamp 1A is mounted. FIG. 2 is a perspective view showing a configuration of the vehicle lamp 1A. FIG. 3 is a plan view showing a configuration of the vehicle lamp 1A. FIG. 4 is a cross-sectional view showing a configuration of the vehicle lamp 1A and an optical path of first light L1. FIG. 5 is an enlarged cross-sectional view of a surrounded portion V shown in FIG. 4. FIG. 6 is an enlarged cross-sectional view of a surrounded portion VI shown in FIG. 4. FIG. 7 is a cross-sectional view showing a configuration of the vehicle lamp 1A and an optical path of second light L2.

As shown in FIG. 1, the vehicle lamp 1A of the embodiment is obtained by applying the present invention to a clearance lamp 102 configured to emit white light, among head lamp units 101 mounted on both corner portions on a front end side of the vehicle 100 (in the embodiment, a corner portion on a right front end side). The head lamp unit 101 includes a head lamp 103 configured to emit white light, and a turn lamp 104 configured to blink and emit orange light, in addition to the clearance lamp 102.

In the vehicle lamp 1A of the embodiment, as the clearance lamp 102, together with the turn lamp 104, when a position when the vehicle 100 is seen from the front is set as 0°, the legal standard light distribution angle (visual recognition angle) is set within an angular range of +80° outward and −45° inward in the vehicle width direction, and ±15° in the upward/downward direction.

As shown in FIG. 2, FIG. 3 and FIG. 4, the vehicle lamp 1A of the embodiment includes a housing 2 with a front surface that is open, and a lighting body 4 constituted by a transparent outer lens 3 configured to cover an opening of the housing 2.

In the lighting body 4, in accordance with the slant shape given to the corner portion of the front end side of the vehicle, the outer lens 3 has a shape that is inclined in a direction in which the outer side recedes more than the inner side in the vehicle width direction.

Further, the outer lens 3 is not limited to such an inclination, and may be curved in a direction in which the outer side recedes more than the inner side in the vehicle width direction. In addition, the shape of the lighting body 4 may be changed as appropriate according to design or the like of the vehicle.

The vehicle lamp 1A of the embodiment includes a first light emitting unit 7A including a first light source 5A and a first light guide lens 6A, a second light emitting unit 7B including a second light source 5B and a second light guide lens 6B, and an inner lens 8, and these are disposed inside the lighting body 4.

The first light emitting unit 7A causes the first light L1 emitted from the first light source 5A to enter from the base end side of the first light guide lens 6A, guides the first light L1 toward the tip side of the first light guide lens 6A, and emits the first light L1 reflected by a plurality of reflection cuts 9*a* provided on the back surface side of the first light guide lens 6A from the front surface side of the first light guide lens 6A, thereby causing a first light emitting surface 10*a* provided on the front surface side of the first light guide lens 6A to emit light.

The second light emitting unit 7B causes the second light L2 emitted from the second light source 5B to enter from the base end side of the second light guide lens 6B, guides the second light L2 toward the tip side of the second light guide lens 6B, and emits the second light L2 reflected by a plurality of reflection cuts 9*b* provided on the back surface side of the second light guide lens 6B from the front surface of the second light guide lens 6B, thereby causing a second light emitting surface 10*b* provided on the front surface side of the second light guide lens 6B to emit light.

The first light source 5A and the second light source 5B are constituted by, for example, light emitting diodes (LEDs) configured to emit white light. The first light source 5A and the second light source 5B radially emit the first light L1 and the second light L2 in a direction perpendicular to one surfaces of circuit boards 11A and 11B (the front surface side) while mounted on the one surfaces (in the embodiment, front surfaces) of the circuit boards 11A and 11B, respectively.

The first light guide lens 6A and the second light guide lens 6B are constituted by light guide bodies configured to guide the first light L1 and the second light L2 emitted from the first light source 5A and the second light source 5B. Light transmission members formed of a material having a refractive index higher than that of air, for example, a transparent resin such as polycarbonate, acryl, or the like, glass, or the like, can be used for the first light guide lens 6A and the second light guide lens 6B.

The first light guide lens 6A and the second light guide lens 6B constitute one lens coupling body 12 in which they are connected to each other via a connecting portion 12*a* while arranged next to each other in the vehicle width direction. That is, the lens coupling body 12 forms a light emitting surface in which the first light emitting surface 10*a* and the second light emitting surface 10*b* are continuous in the vehicle width direction by connecting the back surface on the tip side of the first light guide lens 6A and the front surface on the base end side of the second light guide lens 6B via the connecting portion 12*a*. In addition, the lens coupling body 12 is disposed in a state in which the base end side of each of the light guide lenses 6A and 6B is directed outward in the vehicle width direction and the tip side of each of the light guide lenses 6A and 6B is directed inward in the vehicle width direction.

In addition, light incidence parts 13*a* and 13*b* configured to cause the light L1 and L2 emitted from the light sources 5A and 5B to enter the light guide lenses 6A and 6B are provided on base end sides of the light guide lenses 6A and 6B, respectively.

The light incidence parts 13*a* and 13*b* have a convex-surface-shaped first condensing incidence surface located at a center of portions facing the light sources 5A and 5B and based on a parabola where some of the light L1 and L2 emitted from the light sources 5A and 5B enters when seen in a cross-sectional view, a substantially cylindrical second condensing incidence surface located at an inner circumferential side of a portion protruding from a position that surrounds the first condensing incidence surface toward the light sources 5A and 5B and based on a parabola where some of the light L1 and L2 emitted from the light sources 5A and 5B enters when seen in a cross-sectional view, and a truncated conical condensing/reflecting surface located at an outer circumferential side of the protruded portion and based on a parabola where the light L1 and L2 entering from the second condensing incidence surface is reflected when seen in a cross-sectional view, the light L1 and L2 entering from the first condensing incidence surface is condensed closer to the optical axis, and the light L1 and L2 that has entered from the second condensing incidence surface is reflected by the condensing/reflecting surface and condensed closer to the optical axis.

Accordingly, in the light incidence parts 13*a* and 13*b*, the light L1 and L2 emitted from the light sources 5A and 5B can enter the light guide lenses 6A and 6B while being parallelized (collimated), respectively.

In addition, reflecting parts 14*a* and 14*b* configured to reflect the light L1 and L2 entering from the light incidence parts 13*a* and 13*b* toward tip sides of the light guide lenses 6A and 6B are provided at positions of the light guide lenses 6A and 6B facing the light incidence parts 13*a* and 13*b*, respectively. The reflecting parts 14*a* and 14*b* are constituted by reflecting surfaces inclined toward the tip sides of the light guide lenses 6A and 6B, respectively, by a predetermined angle (in the embodiment, 45° with respect to the optical axes of the light L1 and L2).

Further, in the embodiment, while an inclined angle of the reflecting surface that constitutes the above-mentioned reflecting parts 14*a* and 14*b* is set to 450 with respect to the optical axis of the light L1 and L2, it may be set to 450 or more.

The plurality of reflection cuts 9*a* and 9*b* are configured by periodically arranging substantially V-shaped groove portions cutout in the upward/downward direction of the light guide lenses 6A and 6B in a direction in which the light guide lenses 6A and 6B extend (vehicle width direction). Further, the shape of the groove portion that constitutes the reflection cuts 9*a* and 9*b* is not limited to the above-mentioned V-shaped cross-sectional shape, and an apex portion of the groove portion may have a planar surface or may have a curved surface.

In addition, in each of the light guide lenses 6A and 6B, a depth of the groove portion that constitutes the plurality of reflection cuts 9*a* and 9*b* is gradually increased from a base end side toward a tip side such that a difference in light quantity (brightness) of the light L1 and L2 reflected toward the front surface does not occur according to a difference in optical path length of the light L1 and L2 guided from the base end side toward the tip side. Accordingly, the light L1 and L2 reflected by the plurality of reflection cuts 9*a* and 9*b* can be made uniform between the base end side and the tip side of each of the light guide lenses 6A and 6B.

The first light emitting surface 10*a* and the second light emitting surface 10*b* are constituted by flat surfaces (planes), and the first light L1 and the second light L2 reflected by the plurality of reflection cuts 9*a* and 9*b* are emitted from the front surface sides of the first light guide lens 6A and the second light guide lens 6B. Accordingly, as the light emitting part of the clearance lamp 102, the first light emitting surface 10*a* and the second light emitting surface 10*b* can emit white light.

The inner lens 8 is constituted by a colorless (clear) transparent light transmission member, and is disposed to cover the front surfaces of the first light guide lens 6A and the second light guide lens 6B. The inner lens 8 allows the first light L1 and the second light L2 emitted from the first light emitting surface 10*a* and the second light emitting surface 10*b* to enter the inside from the back surface side, and then, to emit the light from the front surface side to the outside.

In addition, in the inner lens 8, a plurality of diffusion cuts 8*a* configured to diffuse the first light L1 and the second light L2 emitted from the inner lens 8 toward the outside are provided on at least one of the back surface and the front surface (in the embodiment, the front surface).

As the diffusion cuts 8*a*, for example, a concavo-convex structure formed by performing lens cutting referred to as a flute cut or a fisheye cut, knurling, embossing, or the like, can be exemplified. In addition, it is possible to control a diffusion degree of the emitted light L1 and L2 by adjusting a shape of the diffusion cuts 8*a* or the like. In the embodiment, as the diffusion cuts 8*a*, a fisheye cut is provided which is configured to diffuse the light L1 and L2, which is emitted from the inner lens 8, in the upward/downward direction and the forward/rearward direction of the vehicle.

The outer lens 3 is constituted by a colorless (clear) transparent light transmission member and disposed to cover the front surface side of the inner lens 8. The outer lens 3 causes the first light L1 and the second light L2 emitted from the inner lens 8 to enter the inside from the back surface side, and then, emit the light to the outside from the front surface side.

Incidentally, in the connecting portion 12*a* of the embodiment, as shown in FIG. 4, a first lateral emission surface 15 configured to emit some of the first light L1 guided into the first light guide lens 6A toward the inner side in the vehicle width direction.

The first lateral emission surface 15 is located on a tip side of the first light guide lens 6A, and constituted by a flat surface (plane) in the forward/rearward direction while facing a reflecting part 14*a*. Accordingly, among the first light L1 guided into the first light guide lens 6A, the first lateral emission surface 15 emits the first light L1, which is reflected by a surface near the front of the reflecting part 14*a* and which is directly emitted toward the first lateral emission surface 15, toward the inner side in the vehicle width direction.

Meanwhile, the first light L1 reflected by the other surfaces of the reflecting part 14*a* and directed toward the back surface side of the first light guide lens 6A is reflected by the plurality of reflection cuts 9*a* toward the front surface side of the first light guide lens 6A and is emitted from the first light emitting surface 10*a*.

Further, while the groove portion that constitutes the reflection cuts 9*a* is based on the above-mentioned V-shaped cross section, by forming the apex portion of the groove portion in a planar surface or a curved surface, the first light L1 can be guided toward the tip side of the first light guide lens 6A while not only being reflected toward the front surface side of the first light guide lens 6A but also repeating reflection in the first light guide lens 6A.

In addition, while the first lateral emission surface 15 is a flat surface (plane) along the above-mentioned forward/rearward direction, it may be a flat surface slightly inclined from the forward/rearward direction. In addition, in order to make it easier to refract the first light L1 in a front diagonal direction, the surface may be inclined toward the tip side as it goes rearward. By adjusting the angle of the flat surface, the refraction angle can be adjusted. Further, a configuration may also be adopted in which a cut for refraction control (for example, a serration cut) is provided on this surface.

As shown in FIG. 7, a second lateral emission surface 16 configured to emit some of the second light L2 guided into the second light guide lens 6B toward the inner side in the vehicle width direction is provided on the tip side of the second light guide lens 6B.

The second lateral emission surface 16 becomes a part of the second light emitting surface 10*b*, and among the second light L2 guided into the second light guide lens 6B, the second light L2 is emitted from the second light emitting surface 10*b* on the tip side of the second light guide lens 6B toward the inner side in the vehicle width direction.

In addition, among the second light L2 guided into the second light guide lens 6B, the light L2 reflected by the second reflecting part is designed not to advance directly at the tip portion of the second light guide lens 6B. For this reason, the second light L2 reflected by the reflecting part 14*b* is directed toward the back surface side of the second light guide lens 6B, is reflected toward the front surface side of the second light guide lens 6B by the plurality of reflection cuts 9*b*, and is emitted from the second light emitting surface 10*b*.

Further, while the groove portion that constitutes the reflection cuts 9*b* is based on the above-mentioned substantially V-shaped cross section, by forming the apex portion of the groove portion in a planar surface or a curved surface, the second light L2 is guided toward the tip side of the second light guide lens 6B while not only being reflected toward the front surface side of the second light guide lens 6B but also repeating reflection in the second light guide lens 6B.

In addition, the tip portion of the second light guide lens 6B is formed in a triangular shape (or may be a semi-circular shape). For this reason, the second light L2 entering the tip portion of the second light guide lens 6B is reflected toward the base end side of the second light guide lens 6B, is reflected toward the front surface side of the second light guide lens 6B by the plurality of reflection cuts 9*b*, and then, is emitted from the second light emitting surface 10*b*.

Meanwhile, as shown in FIG. 4, FIG. 5 and FIG. 7, a first transmission part 17 configured to transmit the first light L1 emitted from the first lateral emission surface 15 and the second light L2 emitted from the second lateral emission surface 16 is provided on the inner lens 8.

The first transmission part 17 is provided on a standing wall portion extending rearward from the inner side in the vehicle width direction of the inner lens 8. In addition, a first light distribution controller 18 configured to control a light distribution of the first light L1 and the second light L2 emitted from the first transmission part 17 toward the inner side in the vehicle width direction is provided on the first transmission part 17.

The first light distribution controller 18 is constituted by a plurality of prism cuts, and controls a light distribution of the first light L1 and the second light L2 so that the first light L1 and the second light L2 advances toward the inner side in the vehicle width direction from the first transmission part 17 while refracting the first light L1 and the second light L2 entering the first transmission part 17.

Further, while there is the configuration in which the first light distribution controller 18 is provided on the inner surface of the first transmission part 17 in the embodiment, the first light distribution controller 18 may be provided on the outer surface of the first transmission part 17.

In addition, as shown in FIG. 4, FIG. 6 and FIG. 7, a second transmission part 19 configured to transmit the first light L1 and the second light L2 passing through the first transmission part 17 is provided on the outer lens 3.

The second transmission part 19 is provided on a standing wall portion extending rearward from the inner side in the vehicle width direction of the outer lens 3. In addition, a second light distribution controller 20 configured to control a light distribution of the first light L1 and the second light L2 emitted from the second transmission part 19 toward the inner side in the vehicle width direction is provided on the second transmission part 19.

The second light distribution controller 20 is constituted by a plurality of prism cuts, and controls a light distribution of the first light L1 and the second light L2 so that the first light L1 and the second light L2 advances from the second transmission part 19 toward the inner side in the vehicle width direction while refracting the first light L1 and the second light L2 entering the second transmission part 19.

Further, while there is a configuration in which the second light distribution controller 20 is provided on the inner surface of the second transmission part 19 in the embodiment, the second light distribution controller 20 may be provided on the outer surface of the second transmission part 19.

In addition, an end portion of a grille 105 of the vehicle 100 is located behind the standing wall portion extending rearward from the inner side in the vehicle width direction of the outer lens 3. The second transmission part 19 is disposed in front of the end portion of the grille 105. Accordingly, the first light L1 and the second light L2 emitted from the second transmission part 19 is not blocked by the grille 105 and radiated inward in the vehicle width direction.

In the vehicle lamp 1A of the embodiment, it is possible to satisfy the legal standard light distribution angle (visual recognition angle) when the clearance lamp 102 is viewed from −45° inward and −15° downward in the vehicle width direction by the first light L1 and the second light L2 radiated toward the inner side in the vehicle width direction.

That is, in the vehicle lamp 1A of the embodiment, it is possible to satisfy the above-mentioned legal standard light distribution angle (visual recognition angle) while holding light intensity of the first light L1 and the second light L2 radiated to the vicinity of −45° inward and −15° downward in the vehicle width direction.

In addition, as shown in FIG. 7, the connecting portion 12*a* of the embodiment has a third light emitting surface 10*c* configured to emit some of the second light L2 guided into the second light guide lens 6B from the front surface side of the connecting portion 12*a*.

The third light emitting surface 10*c* is provided on a stepped portion 21 formed between the first light emitting surface 10*a* and the first lateral emission surface 15 of the first light guide lens 6A. That is, the stepped portion 21 is provided on the connecting portion 12*a* such that the third light emitting surface 10*c* is disposed behind the first light emitting surface 10*a*.

The stepped portion 21 is constituted by a flat surface (plane), and has a shape inclined toward the base end side of the first light guide lens 6A as it goes rearward. For this reason, even when the first light L1 is directed toward the stepped portion 21, the light is not directed toward the front surface side of the first light guide lens 6A and becomes stray light (point light) that is not emitted from the side of the first light emitting surface 10*a*.

Accordingly, in the vehicle lamp 1A of the embodiment, it is possible to emit some of the second light L2 guided into the second light guide lens 6B from the third light emitting surface 10*c* toward the front surface side of the connecting portion 12*a*.

Meanwhile, when such a stepped portion 21 is not provided but the third light emitting surface 10*c* inclined between the first light emitting surface 10*a* and the first lateral emission surface 15 of the first light guide lens 6A is provided, the second light L2 reflected by the third light emitting surface 10*c* becomes stray light (point light) and is emitted from the side of the first light emitting surface 10*a*.

As described above, in the vehicle lamp 1A of the embodiment, it is possible to make the light emitting surfaces 10*a*, 10*b* and 10*c* of the clearance lamp 102 emit light more uniformly in the vehicle width direction while satisfying the above-mentioned legal standard light distribution angle (visual recognition angle).

Second Embodiment

Next, as a second embodiment of the present invention, for example, a vehicle lamp 1B shown in FIG. 8 will be described.

Figure 8:
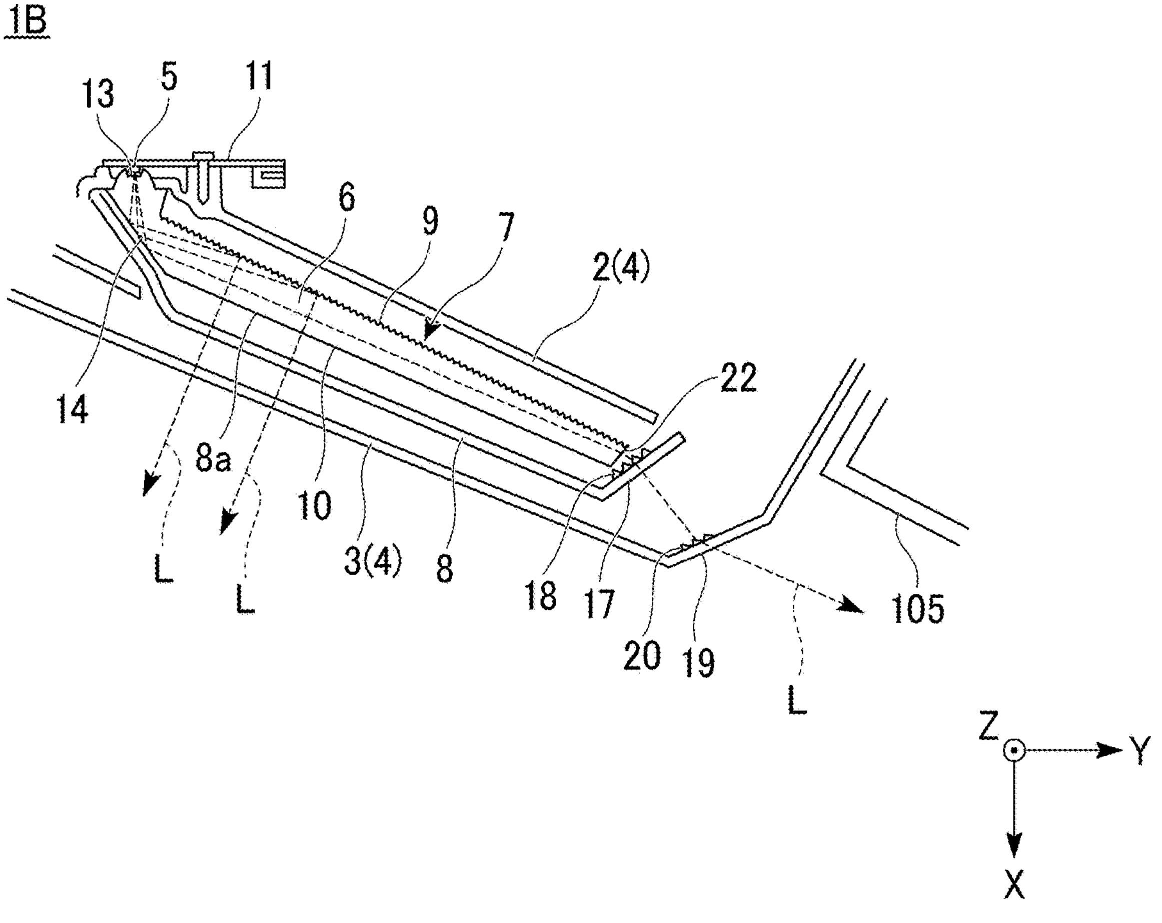
FIG. 8 is a cross-sectional view showing a configuration of a vehicle lamp according to a second embodiment of the present invention and an optical path of light.

Further, FIG. 8 is a cross-sectional view showing a configuration of the vehicle lamp 1B and an optical path of light L. In addition, in the following description, the same components as the vehicle lamp 1A are designated by the same reference signs in the drawings and description thereof will be omitted.

The vehicle lamp 1B of the embodiment includes a light emitting unit 7 including a light source 5 and a light guide lens 6, and an inner lens 8, and these are disposed inside a lighting body 4.

The light emitting unit 7 causes light L emitted from the light source 5 on a circuit board 11 to enter from a light incidence part 13 on a base end side of the light guide lens 6, reflects the light L using a reflecting part 14 located at a position facing the light incidence part 13 and then guides the light L toward the tip side of the light guide lens 6, and emits the light L reflected by a plurality of reflection cuts 9 provided on the back surface side of the light guide lens 6 from the front surface side of the light guide lens 6, thereby causing a light emitting surface 10 provided on the front surface side of the light guide lens 6 to emit light.

That is, the light emitting unit 7 has basically the same configuration as the first light emitting unit 7A except that it is not connected to the above-mentioned second light emitting unit 7B.

Meanwhile, in the vehicle lamp 1B of the embodiment, a lateral emission surface 22 configured to emit some of the light L guided into the light guide lens 6 toward the inner side in the vehicle width direction is provided on the tip side of the light guide lens 6.

The lateral emission surface 22 is located on the tip side of the light guide lens 6 and constituted by a flat surface (plane) in the forward/rearward direction while facing the reflecting part 14. Accordingly, the lateral emission surface 22 emits the light L reflected by the surface near the front of the reflecting part 14 and directly headed to the lateral emission surface 22 toward the inner side in the vehicle width direction, in the light L guided into the light guide lens 6.

Meanwhile, the light L reflected by the other surfaces of the reflecting part and directed toward the back surface side of the light guide lens 6 is reflected toward the front surface side of the light guide lens 6 by the plurality of reflection cuts 9 and emitted from the light emitting surface 10.

Meanwhile, the first transmission part 17 configured to transmit the light L emitted from the lateral emission surface 22 is provided on the inner lens 8. In addition, the first light distribution controller 18 configured to control a light distribution of the light L emitted from the first transmission part 17 toward the inner side in the vehicle width direction is provided on the first transmission part 17.

In addition, the second transmission part 19 configured to transmit the light L passing through the first transmission part 17 is provided on the outer lens 3. In addition, the second light distribution controller 20 configured to control a light distribution of the light L emitted from the second transmission part 19 toward the inner side in the vehicle width direction is provided on the second transmission part 19.

In the vehicle lamp 1B of the embodiment having the above-mentioned configuration, it is possible to satisfy the legal standard light distribution angle (visual recognition angle) when the clearance lamp 102 is viewed in a direction of −45° inward and −15° downward in the vehicle width direction by the light L radiated inward in the vehicle width direction.

That is, in the vehicle lamp 1B of the embodiment, it is possible to satisfy the above-mentioned legal standard light distribution angle (visual recognition angle) while maintaining light intensity of the light L radiated toward the vicinity of −45° inward and −15° downward in the vehicle width direction.

Further, while the lateral emission surface 22 is provided as a flat surface (plane) in the above-mentioned forward/rearward direction, it may be a flat surface slightly inclined from the forward/rearward direction. In addition, in order to make it easier to refract the light L in the diagonal direction forward, the surface may be inclined toward the tip side as it goes rearward. It is possible to adjust a refraction angle by adjusting the angle of the flat surface. Further, cuts for refraction control (for example, serration cuts) may be provided on the surface.

Further, the present invention is not necessarily limited to the embodiment, and various modifications may be made without departing from the scope of the present invention.

For example, in the vehicle lamp 1A, while the one lens coupling body 12 in which the first light guide lens 6A and the second light guide lens 6B are connected to each other via the connecting portion 12*a* is provided, it is possible to extend the lens coupling body 12 in the vehicle width direction by sequentially connecting one light guide lens that becomes the first light guide lens 6A and the other light guide lens that becomes the second light guide lens 6B via the connecting portion 12*a*.

In addition, in the vehicle lamps 1A and 1, while the light emitting surfaces 10*a*, 10*b* and 10 are constituted by flat surfaces (planes) and the plurality of diffusion cuts 8*a* configured to diffuse the light L1 and L2 and L on the inner lens 8 are provided, the plurality of diffusion cuts may be provided on the side of the light emitting surfaces 10*a*, 10*b* and 10.

In addition, in the vehicle lamps 1A and 1, while some of the light L1, L2 and L guided into the light guide lenses 6A, 6B and 6 is emitted toward the inner side in the vehicle width direction, if the disposition is reversed, it is also possible to provide a configuration in which some of the light L1, L2 and L guided into the light guide lenses 6A, 6B and 6 is emitted toward the outer side in the vehicle width direction.

Further, in the embodiment, while the case in which the present invention is applied to the clearance lamp 102 has been exemplified, in addition to this clearance lamp, the present invention can be suitably used for the vehicle lamps that require lateral illumination, such as turn lamps.

In addition, the vehicle lamp to which the present invention is applicable is not limited to the above-mentioned front-side vehicle lamp, and for example, the present invention can also be applied to a rear-side vehicle lamp such as a rear combination lamp or the like. In this case, the present invention is not limited to the rear-side turn lamp and may be applied to a vehicle lamp that requires lateral irradiation, for example, a stop lamp, a tail lamp, a back lamp, or the like.

In addition, color of the light L1, L2 and L emitted from the light sources 5A, 5B and 5 is not limited to the above-mentioned white light, it can be changed to red light, orange light, or the like, as appropriate according to a use of the vehicle lamp.

REFERENCE SIGNS LIST 1A, 1B . . . vehicle lamp 2 . . . housing 3 . . . outer lens 4 . . . lighting body 5 . . . light source 5A . . . first light source 5B . . . second light source 6 . . . light guide lens 6A . . . first light guide lens 6B . . . second light guide lens 7 . . . light emitting unit 7A . . . first light emitting unit 7B . . . second light emitting unit 8 . . . inner lens 9, 9*a*, 9*b* . . . reflection cut 10 . . . light emitting surface 10*a* . . . first light emitting surface 10*b* . . . second light emitting surface 10*c* . . . third light emitting surface 11, 11A, 11B . . . circuit board 12 . . . lens coupling body 12*a* . . . connecting portion 13, 13*a*, 13*b* . . . light incidence part 14, 14*a*, 14*b* . . . reflecting part 15 . . . first lateral emission surface 16 . . . second lateral emission surface 17 . . . first transmission part 18 . . . first light distribution controller 19 . . . second transmission part 20 . . . second light distribution controller 21 . . . stepped portion 22 . . . lateral emission surface 100 . . . vehicle 101 . . . head lamp unit 102 . . . clearance lamp 103 . . . head lamp 104 . . . turn lamp 105 . . . grille L . . . light L1 . . . first light L2 . . . second light

The invention claimed is:

1. A vehicle lamp comprising:

a first light emitting unit including a first light source and a first light guide lens, and configured to cause first light emitted from the first light source to enter from a base end side of the first light guide lens, guide the first light toward a tip side of the first light guide lens, emit the first light reflected by a plurality of reflection cuts provided on a back surface side of the first light guide lens from a front surface side of the first light guide lens, and thus cause a first light emitting surface provided on the front surface side of the first light guide lens to emit light; and a second light emitting unit including a second light source and a second light guide lens, and configured to cause second light emitted from the second light source to enter from a base end side of the second light guide lens, guide the second light toward a tip side of the second light guide lens, emit the second light reflected by a plurality of reflection cuts provided on a back surface side of the second light guide lens from a front surface side of the second light guide lens, and thus cause a second light emitting surface provided on the front surface side of the second light guide lens to emit light, wherein the first light emitting surface and the second light emitting surface form a light emitting surface, which is continuous in a vehicle width direction, by connecting a back surface on the tip side of the first light guide lens and a front surface on the base end side of the second light guide lens via a connecting portion, a first lateral emission surface configured to emit some of the first light guided in the first light guide lens toward an inner side in the vehicle width direction is provided on the connecting portion, wherein the first light guide lens includes a light incidence part configured to cause the first light emitted from the first light source to enter inside of the first light guide lens, and a reflecting part configured to reflect the first light entered from the light incidence part toward the tip side of the first light guide lens, and among the first light guided in the first light guide lens, the first lateral emission surface emits the first light, which is reflected by the reflecting part and directly advances to the first lateral emission surface, toward the inner side in the vehicle width direction.

2. The vehicle lamp according to claim 1, wherein the connecting portion has a third light emitting surface configured to emit some of the second light guided in the second light guide lens toward a front surface side of the connecting portion, and the third light emitting surface is provided on a stepped portion formed between a tip of the first light guide lens and the first lateral emission surface.

3. The vehicle lamp according to claim 1, wherein a second lateral emission surface configured to emit some of the second light, which is guided in the second light guide lens, toward the inner side in the vehicle width direction is provided on the tip side of the second light guide lens.

4. The vehicle lamp according to claim 3, further comprising an inner lens configured to cover a front surface side of the first light guide lens and a front surface side of the second light guide lens, wherein the inner lens has a first transmission part configured to transmit the first light emitted from the first lateral emission surface and the second light emitted from the second lateral emission surface, and a first light distribution controller configured to control a light distribution of the first light and a light distribution of the second light that are emitted from the first transmission part toward the inner side in the vehicle width direction is provided on the first transmission part.

5. The vehicle lamp according to claim 4, further comprising an outer lens configured to cover a front surface side of the inner lens, wherein the outer lens has a second transmission part configured to transmit the first light and the second light that have passed through the first transmission part, and a second light distribution controller configured to control a light distribution of the first light and a light distribution of the second light that are emitted from the second transmission part toward the inner side in the vehicle width direction is provided on the second transmission part.

6. A vehicle lamp comprising a light emitting unit including a light source and a light guide lens, and configured to cause light emitted from the light source to enter from a base end side of the light guide lens, guide first light toward a tip side of the light guide lens, emit the light reflected by a plurality of reflection cuts provided on a back surface side of the light guide lens from a front surface side of the light guide lens, and thus cause a light emitting surface provided on the front surface side of the light guide lens to emit light, wherein a lateral emission surface configured to emit some of the light guided in the light guide lens toward an inner side in a vehicle width direction is provided on the tip side of the light guide lens, wherein the light guide lens includes a light incidence part configured to cause the light emitted from the light source to enter inside of the light guide lens, and a reflecting part configured to reflect the light entered from the light incidence part toward the tip side of the light guide lens, and among the light guided in the light guide lens, the lateral emission surface emits the light, which is reflected by the reflecting part and directly advances to the lateral emission surface, toward the inner side in the vehicle width direction.

7. The vehicle lamp according to claim 6, further comprising an inner lens configured to cover the front surface side of the light guide lens, wherein the inner lens has a first transmission part configured to transmit the light emitted from the lateral emission surface, and a first light distribution controller configured to control a light distribution of the light emitted from the first transmission part toward the inner side in the vehicle width direction is provided on the first transmission part.

8. The vehicle lamp according to claim 7, further comprising an outer lens configured to cover a front surface side of the inner lens, wherein the outer lens has a second transmission part configured to transmit the light passed through the first transmission part, and a second light distribution controller configured to control a light distribution of the light emitted from the second transmission part toward the inner side in the vehicle width direction is provided on the second transmission part.

9. A vehicle lamp comprising:

a first light emitting unit including a first light source and a first light guide lens, and configured to cause first light emitted from the first light source to enter from a base end side of the first light guide lens, guide the first light toward a tip side of the first light guide lens, emit the first light reflected by a plurality of reflection cuts provided on a back surface side of the first light guide lens from a front surface side of the first light guide lens, and thus cause a first light emitting surface provided on the front surface side of the first light guide lens to emit light; and a second light emitting unit including a second light source and a second light guide lens, and configured to cause second light emitted from the second light source to enter from a base end side of the second light guide lens, guide the second light toward a tip side of the second light guide lens, emit the second light reflected by a plurality of reflection cuts provided on a back surface side of the second light guide lens from a front surface side of the second light guide lens, and thus cause a second light emitting surface provided on the front surface side of the second light guide lens to emit light, wherein the first light emitting surface and the second light emitting surface form a light emitting surface, which is continuous in a vehicle width direction, by connecting a back surface on the tip side of the first light guide lens and a front surface on the base end side of the second light guide lens via a connecting portion, a first lateral emission surface configured to emit some of the first light guided in the first light guide lens toward an inner side in the vehicle width direction is provided on the connecting portion, wherein the connecting portion has a third light emitting surface configured to emit some of the second light guided in the second light guide lens toward a front surface side of the connecting portion, and the third light emitting surface is provided on a stepped portion formed between a tip of the first light guide lens and the first lateral emission surface.

* * * * *